Aug. 27, 1963 J. E. R. HARRISON 3,102,183
ABSOLUTE TEMPERATURE CONTROL
Filed Dec. 16, 1960
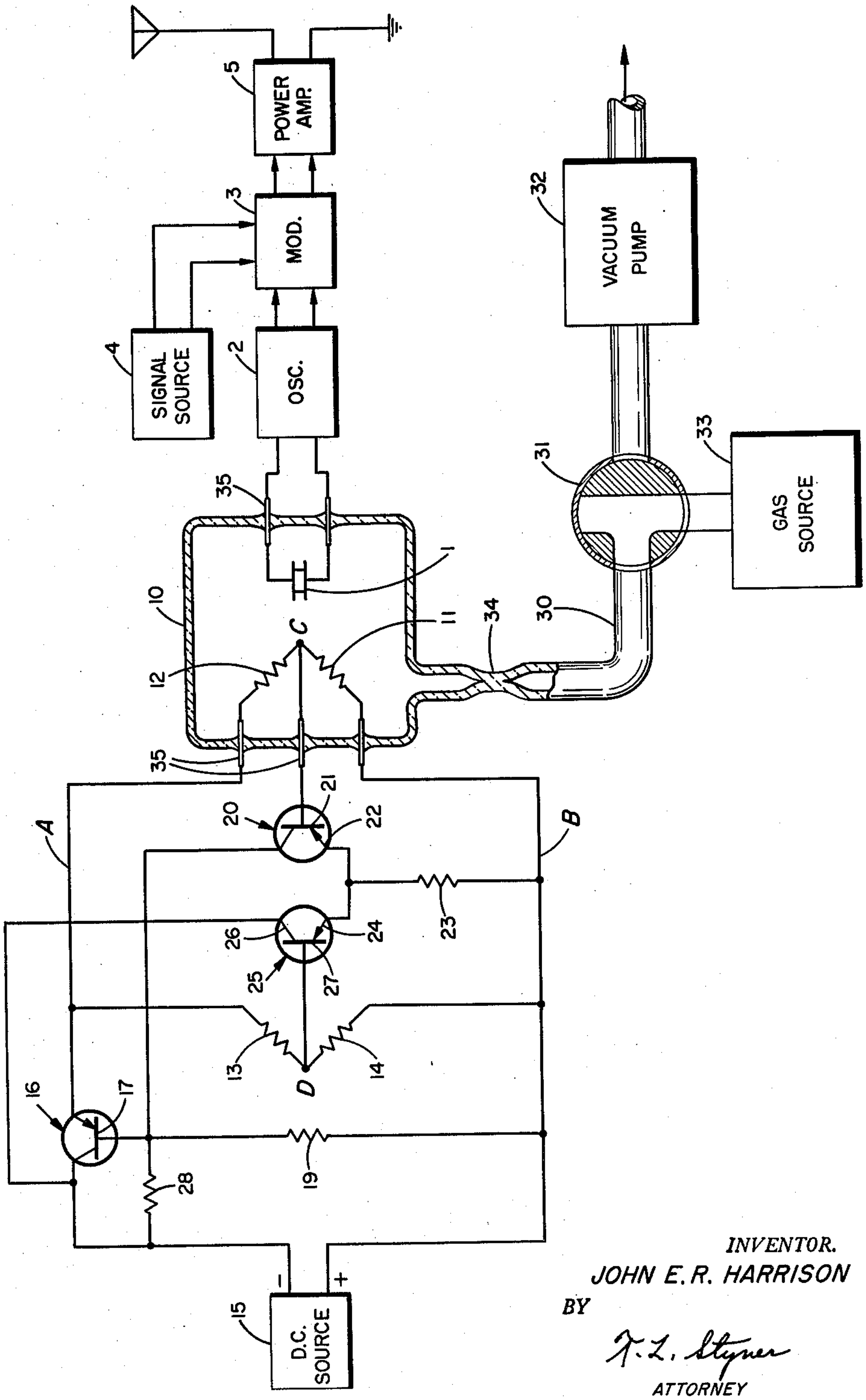
INVENTOR.
JOHN E. R. HARRISON
BY
F. L. Styner
ATTORNEY 3,102,183
Patented Aug. 27, 1963

3,102,183
ABSOLUTE TEMPERATURE CONTROL

John E. R. Harrison, Rochester, N.Y., assignor to General Dynamics Corporation, Rochester, N.Y., a corporation of Delaware Filed Dec. 16, 1960, Ser. No. 76,363
3 Claims. (Cl. 219—20)

This invention relates to temperature controls for ovens and is particularly directed to means for stabilizing the temperature of an oven containing a temperature-sensing element of extreme sensitivity.

Thermostatic controls for ovens customarily comprise a temperature-sensing element and a heating element in the space to be regulated and a power source and a relay or amplifier. In response to temperature changes, the sensing element signals the relay or amplifier to appropriately admit more or less heat to neutralize the temperature change. Amplification of the signal in such a servo loop may be increased to increase the sensitivity of the controls and extensive insulation may be employed to reduce the effects of the ambient atmosphere. Unfortunately, all such servo loops contain losses and electrical and thermal lag and regardless of the sensitivity of and gain in the system, a fairly large incremental change in the oven temperature is necessary to initiate action in the loop. As a practical matter, such incremental changes in the oven temperature has not heretofore been reduced to zero.

An object of this invention is to provide absolute temperature control of temperature in an oven.

A more specific object of this invention is to provide an improved oven temperature control where the gain of the servo control loop is of but nominal value.

The objects of this invention are attained by enclosing the temperature sensing and heating elements in an evacuated envelope, the residual pressure in the envelope being preferably below the value where the mean free path of the gas molecules within the envelope is of the order or greater than the internal dimensions of the oven envelope. Enclosed in the envelope is a heating wire with a relatively high temperature coefficient of resistance. Means responsive to the resistance of the wire continuously controls the voltage applied to the wire and the current through the wire. Since the convected heat energy transferred from the heating wire to the gas is substantially zero, the electrical energy supplied to the wire need be only enough to make up the conduction loss to the wire supports and a small amount of loss by radiation. Because the wire, per se, is almost completely heat insulated, minute changes in electric energy fed in produces wide swings in wire temperature, followed by wide changes in wire resistance, followed in turn by large signal voltages to the electric energy controlling amplifier. Even though the range of temperature change within the evacuated envelope may be held below measurable limits, the amplification in the heat control circuits is of but nominal value.

Other objects and features of this invention will occur to those skilled in the art after referring to the specific embodiment described in the following specification and shown in the accompanying drawing in which the single FIGURE shows a circuit diagram of said embodiment.

A piezoelectric crystal connected as a frequency control element in a radio transmitter is one example of an element where absolute temperature control is desirable, but which heretofore has never been attained. The crystal 1 shown in the drawing is electrically connected in circuit with the oscillator 2 from which must be derived an absolutely stable frequency. Where the oscillator is to be used in a radio transmitter, the oscillator may be connected as shown in the drawing to the modulator 3, where the carrier wave is modulated by the signal source 4 and then amplified in the power amplifier 5 and radiated. The oscillator 2 with absolute frequency control is particularly desirable in single sideband systems in which carrier-suppressed signals are to be transmitted and then received and demodulated.

To accomplish the desired temperature and frequency stability of crystal 1, the crystal is, according to this invention, enclosed in envelope 10 which can be evacuated to the pressure attainable with commercial diffusion pumps. Within the envelope are the heating wires 11 and 12 connected as two branches of a balanced four-sided bridge including also resistors 13 and 14. Resistor 11 is of a material which has a relatively high temperature coefficient of resistance, either positive or negative. Tungsten, for example, has the relatively high positive temperature coefficient of resistance of .0045. The complementary resistor 12, on the other hand, has a temperature coefficient of resistance of opposite sign or of zero or near-zero value. Manganin, for example, has a temperature coefficient of less than .00002. That is, resistors 11, 12, 13 and 14 are selected to produce maximum imbalance of the bridge per unit of temperature change of resistance 11. Resistors 13 and 14 may also be of low coefficient and may be of manganin and should be juxtaposed to respond similarly to ambient temperatures.

Electric power, preferably of direct current, is obtained from source 15. Source 15 is connected across the diagonal A—B of the bridge through the current regulating amplifier 16. Conveniently, the amplifier 16 comprises a transistor which, in the example shown, is of the P-N-P type. The base 17 of the transistor is normally biased to permit optimum collector-to-emitter current to flow, to warm the wires 11 and 12 to the temperature desired in envelope 10. The collector and the emitter of transistor 16 may be reversed if the polarity of the D.C. source 15 is reversed. Biasing resistor 19 is of relatively high value to limit the base current.

Information for changing the base bias of transistor 16 to regulate the current to heating elements 11 and 12 is obtained from transistor 20, with the base 21 connected to the apex C of the bridge. The bias for emitter 22 is established by the common emitter resistor 23 connected in multiple to the emitter 24 of transistor 25, the collector 26 of which is connected to one side of source 15. The base 27 is connected to the remaining apex D of the bridge. Imbalance of the bridge caused by change in resistance 11 results in a change in the potential across diagonal C—D of the bridge and a change in the base-to-emitter potential of transistor 20. The resulting change in collector-emitter current through transistor 20 causes a change in the drop across biasing resistor 28 of transistor 16. This latter change of biasing resistance changes the collector-to-emitter current through transistor 16 to change, as stated, the current through heating elements 11 and 12.

The basis of the extremely narrow temperature control within the evacuated oven envelope resides in the fact that the temperature sensitivity of resistance in a vacuum is extremely high. Where the mean-free path of the molecules within the vacuum is long, the temperature gradient between the heating element 11 and the wall of the envelope is proportional to the square of the current, $I^2$, through the resistor 11, and is inversely proportional to the cube of the resistance $R^3$, of the resistor 11. The sensitivity of the resistor may be still further increased by displacing or flushing out the air molecules in the envelope with molecules of low mass, such as hydrogen or helium, so that the molecular intercollision possibility is reduced. To this end, the envelope 10 is provided with an exhaust tube 30 connected through three-way valve 31 to the vacuum pumping system 32 and to the source 33 of low-mass gas. After evacuation of the envelope to or below the desired pressure level, valve 31 is rotated to admit a small charge of gas from source 33 followed, preferably, with a second pumping. Thereupon, the exhaust tube 30 is sealed off at 34. Where the envelope and exhaust tube are of glass, the well known exhausting and tip-off techniques may be employed.

Heavy lead-in conductors 35 are sealed in the envelope wall; and where the wall is of soft glass, commercial Dumet wire may be employed. Ideally, the resistance elements 11 and 12 and the element 1 to be temperature controlled are supported upon wires of minimum cross-section for minimum heat transfer by conduction. Mechanical considerations, of course, limit the length and diameter of the supporting conducting wires.

Initial balance of the bridge for a given temperature in the envelope may be obtained in either of two ways. First, the proportions of resistance in the bridge arms 13 and 14 may be fixed and the vacuum then pulled down to the pressure which will bring the temperature within the envelope to the desired value. Alternately, the vacuum within the envelope can be fixed and the junction potential at D varied to set the desired temperature. In either case, the frequency of the crystal 1 in circuit with oscillator 2 can be employed to determine by frequency measurement when the desired temperature is reached. Fortunately, piezoelectric crystals usually have a fairly broad flat portion on its frequency-temperature characteristic curve which permits some latitude in the selection of the operating temperature.

According to this invention, the atmosphere within the oven envelope is so rarified as to reduce to zero heat losses by convection. The minutest change in current to heating element 11 caused, say, by drift in supply voltage 15 causes a large and immediate change in resistance of heating element 11 with a resulting large voltage change in potential across diagonal C—D of the bridge. With a large incremental change of voltage at point C, only nominal amplification is required in the feedback circuit to appropriately stimulate the current control amplifier 16 to correct the change and stabilize the disturbance.

What is claimed is:

1. In combination, an oscillator, said oscillator having a frequency determining element the natural frequency of which is a function of temperature, means for maintaining constant the temperature of said element consisting of an evacuated envelope enclosing said element, a heating wire in said envelope, a four-sided balanced bridge, one branch of said bridge comprising said heating wire, a source of heating power, and an amplifier device with a continuously and smoothly variable impedance coupled in circuit between said source and one diagonal of said bridge, said amplifier having a control circuit coupled across the other diagonal of said bridge and responsive to continuous voltage changes to smoothly regulate the flow of heating current through said amplifier to said bridge.

2. In a system for establishing an atmosphere of a stable predetermined temperature, an evacuated envelope, a temperature-sensitive element to be protected in said envelope, an electric heating wire in said envelope and disposed in and free of the side walls of said envelope, said wire being of a metal the resistance of which is a measurable function of temperature, means for applying heating current to said wire to establish said predetermined temperature in said envelope, and means responsive to the resistance of said wire for continuously controlling the current supplied to said wire, the gas pressure in said envelope being so adjusted that the heat energy conducted from said wire to said gas substantially equals the electrical energy supplied to said wire at said predetermined temperature.

3. In combination in a system for stabilizing the temperature of a temperature-sensitive element, an evacuated envelope, said temperature-sensitive element being disposed in said envelope, an electric heating wire in said envelope, said wire being mechanically mounted for minimum heat conduction to its support, said wire having a measurable temperature coefficient of resistance, a four-sided balanced bridge including said wire in one branch of said bridge, a current source, a current amplifier with a control electrode, said amplifier being connected in circuit between said source and one diagonal of said bridge, a voltage sensing amplifier with a control circuit connected across the other diagonal of said bridge, the output of said voltage sensitive amplifier being coupled to the control electrode of said current amplifier, the gas pressure in said envelope being adjusted so that the heat energy conducted from said wire to the gas substantially equals the electrical energy supplied to said wire at said predetermined temperature.

References Cited in the file of this patent

UNITED STATES PATENTS

| | | |
|---|---|---|
| 1,874,980 | Hansell | Aug. 30, 1932 |
| 2,973,420 | Craiglow et al. | Feb. 28, 1961 |
| 3,031,610 | Hamilton | Apr. 24, 1962 |